US005655780A

United States Patent [19]

Gambrill et al.

[11] Patent Number: 5,655,780

[45] Date of Patent: Aug. 12, 1997

[54] MIXER SEAL ASSEMBLY WITH FAST CONNECT COUPLING

[75] Inventors: Jeffrey S. Gambrill, Hilton; Larry G. Porter, Marion; Robert A. Stolpman, Scottsville, all of N.Y.

[73] Assignee: General Signal Corp., Rochester, N.Y.

[21] Appl. No.: 588,500

[22] Filed: Jan. 18, 1996

[51] Int. Cl.$^6$ ........ F16J 15/30

[52] U.S. Cl. ........ 277/8; 277/37; 277/152; 366/64; 494/38

[58] Field of Search ........ 277/37, 152, 8; 366/64; 494/38

[56] References Cited

U.S. PATENT DOCUMENTS

| | | | |
|---|---|---|---|
| 1,307,595 | 6/1919 | Nielsen | 366/311 |
| 2,096,597 | 10/1937 | Seabrooks | 259/110 |
| 2,137,328 | 11/1938 | Bissell | 308/36.1 |
| 2,143,511 | 1/1939 | Farrington | 259/108 |
| 2,144,715 | 1/1939 | Dalzell et al. | 259/108 |
| 2,617,669 | 11/1952 | Ruthman et al. | 286/9 |
| 2,723,110 | 11/1955 | Collins | 259/110 |
| 2,853,085 | 9/1958 | Torkelson | 134/161 |
| 2,911,240 | 11/1959 | Boutros et al. | 286/11.13 |
| 3,887,169 | 6/1975 | Maynard | 259/109 |
| 4,042,248 | 8/1977 | Williamitis | 277/152 |
| 4,127,310 | 11/1978 | Werner | 308/36.1 |
| 4,419,015 | 12/1983 | Liddiard | 366/349 |
| 4,556,222 | 12/1985 | Lewis et al. | 277/9 |
| 4,580,790 | 4/1986 | Doose | 277/228 |
| 4,599,170 | 7/1986 | Friedman et al. | 210/223 |
| 4,647,213 | 3/1987 | Hay, II | 366/199 |
| 4,753,534 | 6/1988 | Markle | 366/279 |
| 4,781,468 | 11/1988 | Herfeld | 366/213 |
| 4,813,786 | 3/1989 | LeMaster | 366/251 |
| 4,822,059 | 4/1989 | Shimasaki et al. | 277/152 |
| 4,878,677 | 11/1989 | Larkins | 277/105 |
| 5,102,151 | 4/1992 | Stolzenfeld | 277/6 |
| 5,203,574 | 4/1993 | Stolzenfeld | 277/6 |
| 5,303,933 | 4/1994 | Larkins | 277/9 |

*Primary Examiner*—William A. Cuchlinski, Jr.
*Assistant Examiner*—Christina Annick
*Attorney, Agent, or Firm*—M. Lukacher

[57] ABSTRACT

A mixer seal assembly for a closable vessel having a dynamic mixer shaft seal in a bore in a vessel flange and a static seal for vessel transport formable by insertion of a disconnected lower portion of a fast connect coupling which is fast to install on the mixer shaft into the flange bore above the dynamic seal. The resulting seal assembly can seal the vessel for over-the-road transport. The dynamic seal includes a circular lip which sealingly engages the surface of the mixer shaft. The static seal includes an O-ring disposed in a first annular groove in the coupling portion. A shaft bushing disposed adjacent to the shaft seal in the flange bore minimizes shaft runout in the shaft seal and permits use of relatively rigid and dry running materials such as fluorocarbon polymer in the shaft seal. In the shut-off position with the coupling portion inserted into the vessel flange, a spring pin mounted in the vessel flange can engage a second annular groove in the coupling portion to lock the coupling portion in the flange bore. In an alternative embodiment for use in retro-fitting existing vessels, the vessel flange of the invention may be configured to sealingly conform to an existing vessel flange.

13 Claims, 5 Drawing Sheets

MIXER SEAL ASSEMBLY WITH FAST CONNECT COUPLING

DESCRIPTION

The present invention relates to couplings between mixer drives and mixer shafts for mixing systems in closed vessels, more particularly to such couplings wherein the coupling is readily separable to permit removal of the mixer drive from the vessel, and most particularly to a system wherein a vessel-mounted flange having a dynamic shaft seal cooperates with a lower coupling portion fixedly attached to a mixer shaft to form a positive seal against escape of vessel contents.

In industrial mixing applications, closable vessels are typically used to contain volatile liquid and/or solid chemicals to be mixed or blended. For example, paints may be prepared in, and dispensed from, such vessels. Frequently, it is necessary to transport vessels charged with chemical contents to other locations for further processing steps or for final dispensing of the contents. In many installations or uses, it is desirable that the mixer drive assembly, including electric motor, gearbox, housing, and controls, remain at the mixing site; that is, the drive assembly may be site-specific while the vessels may be portable.

To facilitate removal of a mixer drive assembly from a vessel, or attachment of a drive assembly thereto, it is known to provide a "quick connect" coupling wherein an upper portion of the coupling is fixedly attached to the motor drive and a matable lower portion of the coupling is fixedly attached to the upper end of mixer shaft. The upper and lower coupling portions may mate via a conventional bayonet twist-lock mechanism. Typically, the mixer shaft is free to slide axially through a port in a vessel flange. Upon disconnection of the coupling portions, the shaft can slide downward further into the vessel until the lower coupling portion encounters the vessel flange assembly. The drive can then be removed from the vessel, and the vessel transported.

Such a quick connect system is available, for example, from Lightnin Mixers, a unit of General Signal Corporation located in Rochester, N.Y. A disadvantage of this system is that no positive liquid or vapor seal to the contents of the vessel is provided by the engaging of the lower coupling portion and the vessel flange assembly. In fact, no mechanism other than gravity is provided to retain the coupling portion and hanging shaft in the shut-off position. Typically, the shaft is dynamically sealed in the vessel flange by a conventional stuffing box and packing gland, but such an archaic seal is prone to leak and may not provide adequate protection against escape of vapors from the vessel during mixing use or transport. Thus there is a need for an improved static and dynamic shaft seal.

A similar separable-coupling system is disclosed in U.S. Pat. No. 5,102,151 issued Apr. 7, 1992 to Stolzenfeld. This system is both superior and inferior to the Lightnin Mixers system discussed supra. Stolzenfeld provides no shaft seal at all, relying on a slinger ring disposed on the mixer shaft within the vessel to prevent dynamic leakage of liquid contents. There is no provision for containment of vapors during operation of the mixing system when the separable coupling is connected. This is inferior to the stuffing box and packing gland. However, the Stolzenfeld lower coupling portion is provided with an O-ring in a groove on the lower axial face thereof which can form a seal against both a mating surface of the vessel flange and the surface of the mixer shaft, as shown in FIG. 5 of the Stolzenfeld patent. Rotation of the lower coupling portion serves to engage and lock it with the vessel flange. The Lightnin Mixers design makes no provision for such a lock.

A serious drawback of the disclosed Stolzenfeld design is the potential for distortion and damage to the O-ring with repeated use. To form the desired seal, the O-ring must be partially extruded into the annular gap between the shaft and the vessel flange. This rolling and shearing deformation of the O-ring can cause loss of integrity in the ring and failure of the seal with repeated use. The O-ring may fall out of the groove and may become cut or sliced by the sealing action, subsequently forming an imperfect seal. Since this O-ring is the only seal element anywhere on the mixer shaft, failure of the O-ring can result in escape of vapors from the vessel, particularly if the contents are under pressure.

On Jul. 26, 1994, the United States Department of Transportation (DOT) promulgated regulation 49 CFR $171 et seq. (Intermediate Bulk Containers for Hazardous Materials), effective Oct. 1, 1996, defining performance standards for closed vessels being transported over the road, such that an effective and low cost coupling and sealing mechanism is required to meet both commercial and governmental requirements.

A feature of this invention is to provide an improved vessel sealing system which still incorporates a quick connect mechanism system and nevertheless provides a positive static seal not vulnerable to use damage, which can be used to retro-fit existing vessels rapidly and inexpensively, and which can also be used as original equipment on new vessels. An ancillary feature of this system is the incorporation of a modern, efficient, dynamic shaft seal to replace and update a stuffing box seal, or the slinger.

It is a principal object of the invention to provide an improved quick connect coupling system for a mixer shaft in a vessel wherein a vessel flange having a dynamic shaft seal cooperates with a portion of a separable coupling to form a static seal against escape of vessel contents.

It is a further object of the invention to provide such an improved quick connect coupling system wherein the resulting static seal meets the requirements of Federal regulations as published in 47 CFR $171 et seq.

It is a still further object of the invention to provide such an improved quick connect coupling system wherein a static seal is formed by an elastomeric element between an outer radial surface of the separable coupling portion and an inner cylindrical surface of a bore in the vessel flange.

It is a still further object of the invention to provide an improved quick connect coupling system wherein a shaft seal and at least one O-ring seal cooperate in series to prevent escape of contents from a vessel.

It is a further object of this invention to provide a low cost and effect seal assembly which eliminates the need for an axial compression mechanism as in the Stolzenfeld style coupling.

Briefly described, a mixer system embodying the invention includes a vessel flange sealingly attachable as by welding or bolting to a port in a vessel also called the opening in the vessel wall. The vessel flange has a stepped central bore therethrough also referred to as the flange bore to permit insertion of a mixer shaft into the vessel. A circular shaft seal encircling the shaft, preferably formed from a resilient fluorocarbon polymer, is disposed on a step in the bore and is sealed on its outer surface to the bore as by an O-ring or other sealant. Immediately above the shaft seal in the bore is disposed a shaft bearing or bushing, preferably a bushing formed from a fluorocarbon polymer, which is held in place as by a snap ring in an annular groove in the bore.

A lower quick connect coupling member, matable conventionally with a conventional upper quick connect coupling member disposed conventionally on a mixer drive shaft, has a cylindrical outer surface over a lower portion of its axial length, the diameter of this cylindrical portion being slightly less than the diameter of the bore in the vessel flange above the bushing and being receivable therein. The lower coupling member is provided with an inner axial bore smaller in diameter than the diameter of the mixer shaft and with a longitudinal keyway. The mixer shaft is conventionally reduced in diameter over a portion of its length near the upper end and is provided with a matching keyway so that the lower coupling member fits snugly onto the upper end of the mixer shaft and is keyed thereon to be rotatable with the mixer shaft. An axial cap screw and washer threaded into the upper end of the mixer shaft serve to draw the shaft into the coupling portion and retain it there. The lower end of the lower coupling portion rests against a step in the mixer shaft, and a static sealing element, for example, an O-ring, is provided therebetween.

The cylindrical outer surface of the lower coupling portion is provided with a first annular groove for retaining an O-ring which is compressible in the annular space between the coupling portion and the bore in the vessel flange to form a positive static seal when the lower coupling portion is disengaged from the upper coupling portion and is in the "shut-off" position. A spring-loaded pin disposed radially in a transverse bore in the vessel flange also referred to as a flange bore engages a second annular groove in the coupling portion above the O-ring groove to lock the coupling portion in the shut-off, sealed position.

The improved vessel flange may be formed for mounting as by welding on a vessel as the original vessel flange, or it may be formed as a retro-fit flange to be bolted onto a pre-existing vessel flange.

The foregoing and other objects, features, and advantages of the invention, as well as presently preferred embodiments thereof, will become more apparent from a reading of the following description in connection with the accompanying drawings in which.

Figure 1:
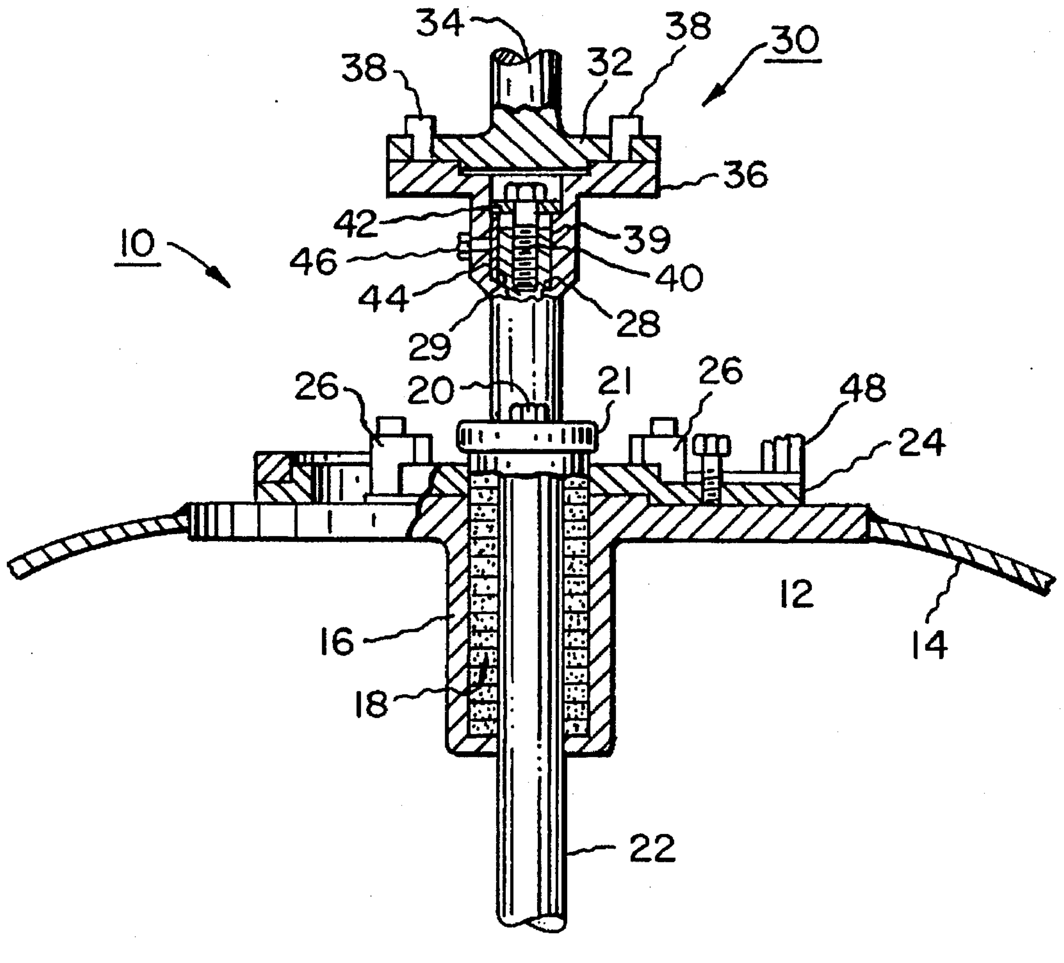
FIG. 1 (PRIOR ART)
FIG. 1 is an elevational view, partially in cross-section, of a quick connect mixer shaft coupling and vessel flange in accordance with the prior art.

Referring to FIG. 1, there is shown a quick connect mixer shaft coupling and seal assembly 10 in accordance with the prior art, the assembly being in mixing, or running, position. A vessel flange 12 is mounted as by welding in a port in the top of a closable vessel 14 also referred to as the opening in the vessel wall. Flange 12 includes a well 16 defining a stuffing box for packing rings 18 which are compressed by bolt 20 in packing gland 21 to form a cylindrical compression seal around mixer shaft 22 whereby materials within vessel 14 are substantially prevented from escaping the vessel along the surface of shaft 22. Packing gland 21 is mounted by bolts (not shown) to a flange adapter base 24 which is connected to vessel flange 12 by flange lugs 26. Shaft 22 extends upward through stuffing box 18 and packing gland 21, the upper portion 28 of the shaft being stepped to a smaller diameter and having a threaded axial bore 29 at the upper end. A quick connect/disconnect shaft coupling 30 has an upper coupling portion 32 mounted on mixer drive shaft 34 and a lower coupling portion 36 having lugs 38 which extend through openings in upper portion 32 and lock on ramps on the upper surface of portion 32 by rotation of lower portion 36. Portion 36 has an axial bore 39 sized to accept snugly upper shaft portion 28. Bolt 40 extends through thrust plate 42 and is threaded into axial bore 29 thereby affixing coupling portion 36 on the end of shaft 22. A key 44 in mating keyways in the shaft and coupling portion prevents rotation of the coupling portion on the shaft. Key 44 is retained by set screw 46. A mixer drive carried on a pedestal (a fragment of which is shown at 48) (not shown) is mounted on flange adapter base 24 by bolts (not shown). To disconnect the mixer and prepare the vessel for transport, the lower coupling portion is counter-rotated relative to the upper portion to free lugs 38. The shaft is then lowered into the vessel until the coupling portion rests on the packing gland, and the pedestal is unbolted from the flange adapter base. Adapter base stays with mixer pedestal.

Figure 2:
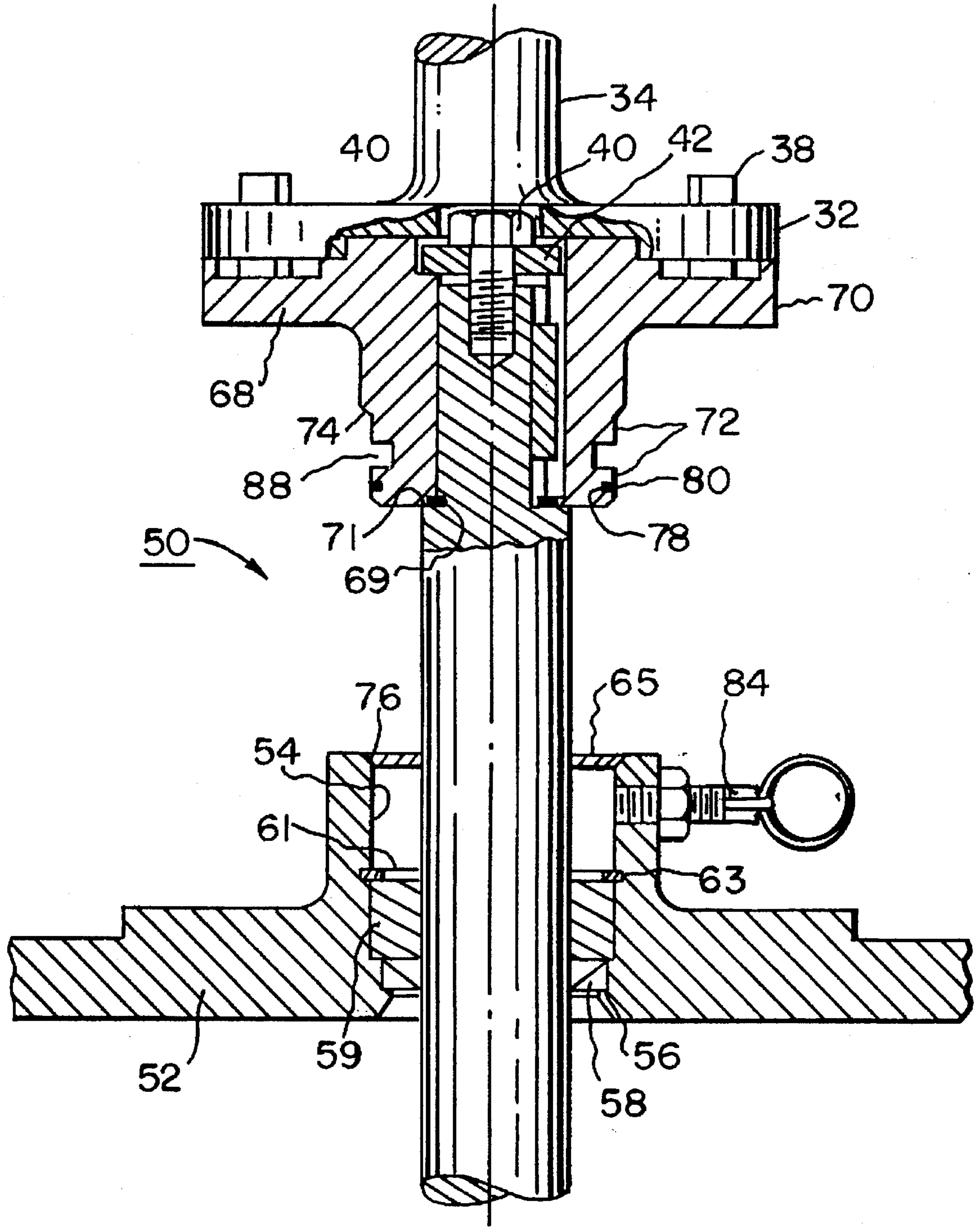
FIG. 2 is an elevational view, partially in cross-section, of a quick connect mixer shaft coupling and vessel flange for a new vessel in accordance with the subject invention, showing the coupling in the connected, operating position.
Figure 3:
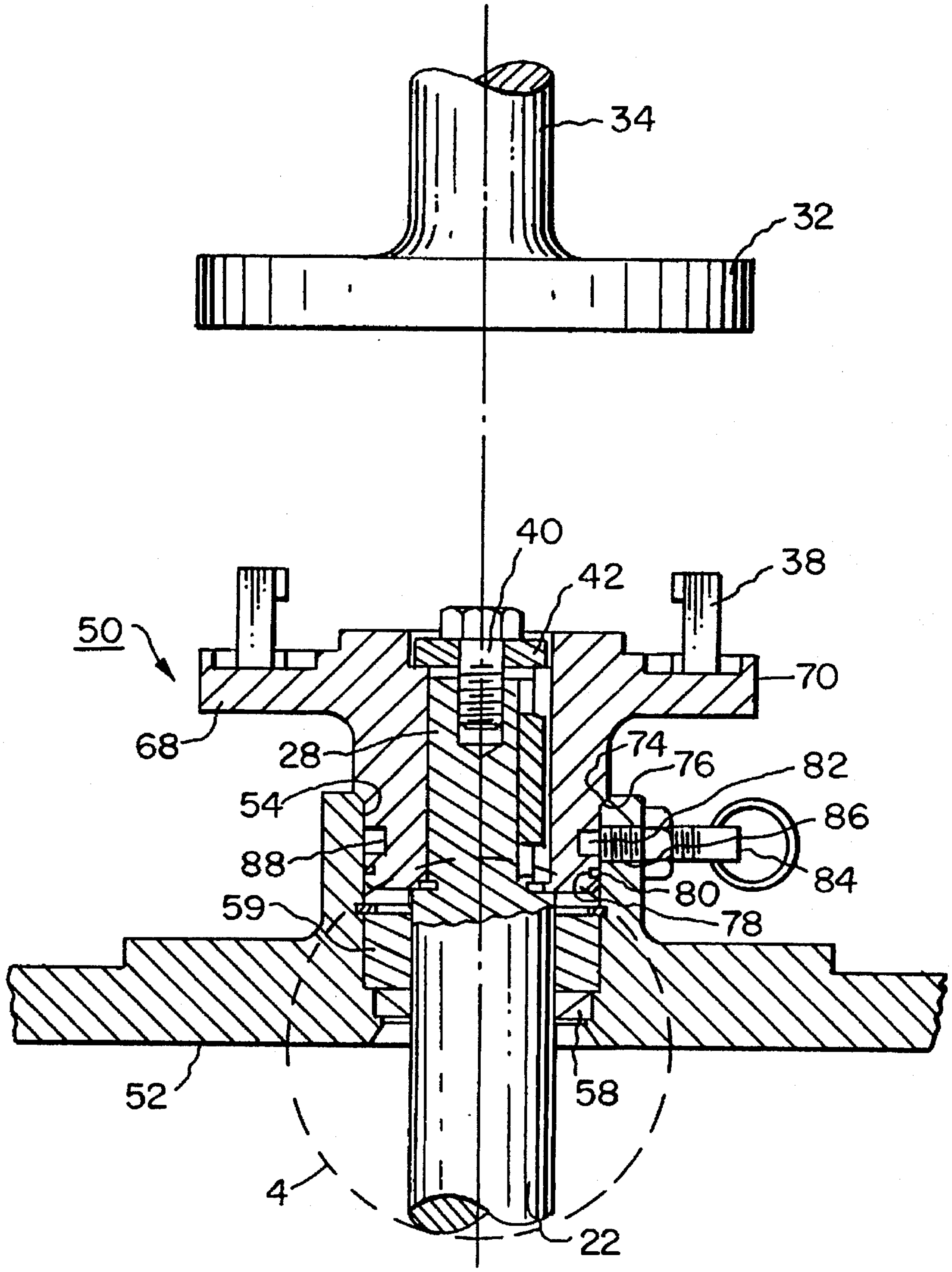
FIG. 3 is an elevational view like that of FIG. 2, showing the coupling in disconnected, sealed, and locked position.

Referring to FIGS. 2 and 3, an improved quick connect mixer shaft coupling and seal assembly 50 has a vessel flange 52 having an axial bore 54 also referred to as a flange bore allowing insertion of mixer shaft 22 into the vessel. Bore 54 is stepped to provide a seat 56 for a dynamic ring seal 58 which seals shaft 22 from escape of materials from the vessel along the surface of shaft 22. Ring seal 58 can be any commercially-available lip seal, but preferably is a lip seal available from Furon Corp., Los Alametas, Calif., as described in more detail infra. A cylindrical shaft bearing 59, preferably a bushing formed preferably from a fluorocarbon polymer, preferably Fluorosint available from Polymer Corp. of Reading, Pa., is disposed above seal 58 in bore 54 to support radial deflection on the mixer shaft imposed during mixing of materials in the vessel. Bearing 59 is retained in bore 54 by a spring clip 61 disposed in annular groove 63 in bore 54. A cover 65 may optionally be disposed to shield the bearing 59.

Figure 4:
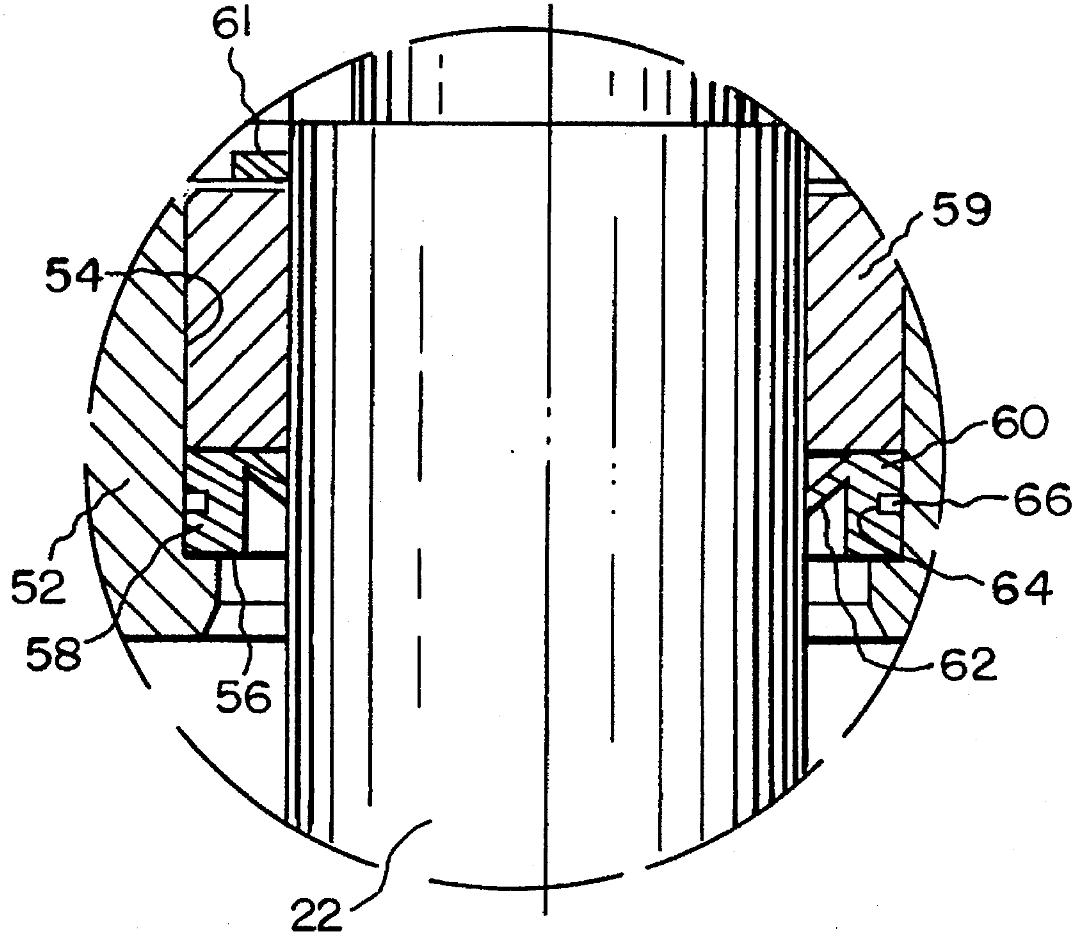
FIG. 4 is a close-up view of the area in Circle 4 in FIG. 3, showing detail of the improved shaft seal.

The preferred seal is shown in greater detail in FIG. 4. A rod-section of a fluorocarbon polymer, preferably Rulon J, is machined to form a cylindrical body 60 and a downward-facing sealing flange 62. The finished inner diameter of flange 62 is preferably a few thousandths of an inch larger than the outer diameter of the mixer shaft so that a snug fit of the flange to the shaft is formed when the shaft is inserted through the seal. Body 60 is provided with an annular groove 64 in its outer surface to retain an O-ring 66 therein to statically seal the body from leakage around the seal. Locating the shaft seal immediately adjacent to a shaft bushing minimizes the radial shaft runout experienced by the seal and permits use of seal-forming materials which are less flexible and more durable than materials required previously.

Known dynamic seals typically employ an elastomer lip urged against the shaft by a circular backing spring. Such a seal can be difficult to clean between mixer batches of materials. The shaft seal disclosed herein does not require a backing spring and is readily cleanable under the sealing flange. When new and properly maintained, preferred seal 58 may seal the shaft from leakage at pressure differentials exceeding 100 psi. All dynamic seals wear with use, however, and seal 58 by itself cannot meet the sealing standard for over-the-road transport of a vessel set by 49 CFR $171. Accordingly, improved lower coupling portion 68 is adapted to provide an additional, lockable, static seal.

Coupling portion 68 is configured on its upper surface identically with prior art coupling portion 36 and can therefore substitute fully for portion 36 in forming a shaft coupling with conventional upper portion 32. Portion 68 is provided with a keyed inner bore identical in diameter to bore 38 in portion 36, permitting identical mounting and connection to shaft 22 by bolt 40. Additionally, an O-ring 69 is provided at the step 71 in the mixer shaft to prevent leakage of material between the mixer shaft and the lower coupling portion. Below the mating flange 70 of coupling portion 68, a cylindrical portion 72 is provided, having a diameter substantially the same as that of bore 54. Unlike the prior art quick connect wherein the coupling portion simply rests on the packing gland, the subject coupling portion 68 is receivable within bore 54 of the vessel flange (after removal of bearing cover 65) until chamfered step 74 meets the chamfered surface of sealing flange 76. A first annular groove 78 in cylindrical portion 72 is provided to retain an elastomeric sealing member 80, preferably an O-ring, which is compressed by the insertion of portion 72 into bore 54 to form a static, positive seal against leakage therebetween. This seal meets the Federal requirements for over-the-road sealing of vessels containing hazardous materials. The chamfered edge of flange 76 facilitates entry of O-ring 80 into bore 54, reducing wear on the O-ring and decreasing the likelihood of damage to the O-ring.

In "shut-off" position as shown in FIG. 3, lower coupling portion 68 is locked and retained in shut-off position by a spring pin 82 having a housing 84 disposed in a threaded bore 86 in sealing flange 76. When released, pin 82 engages a second annular groove 88 in cylindrical portion 72, preventing disengagement of coupling portion 68 from sealing flange 76.

Figure 5:
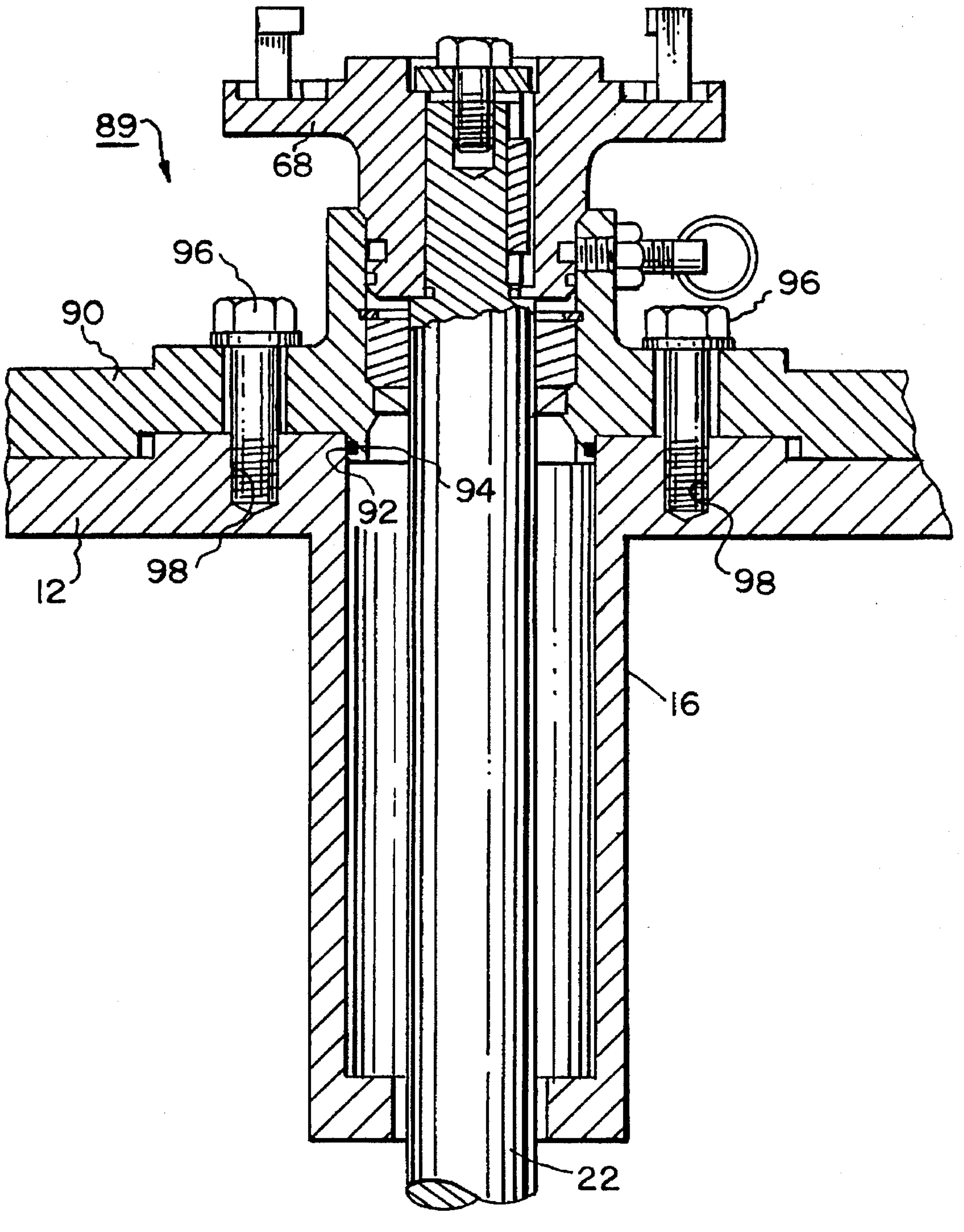
FIG. 5 is an elevational view, partially in cross-section, of a quick connect mixer shaft coupling and retro-fit vessel flange for an existing vessel previously having a stuffing box shaft seal like that shown in FIG. 1.

Apparatus in accordance with the invention can also be used to retro-fit existing vessels. Suitable retro-fit apparatus 89 is shown in the embodiment in FIG. 5. An existing vessel 14 having a flange 12 and stuffing box 16 is shown as in FIG. 1. The packing discs 18 have been removed and discarded, and the stuffing box is vestigial. A secondary vessel adapter flange 90, similar to vessel flange 52 also called the opening in the vessel flange in FIGS. 2–4, is adapted on its underside to replace flange adapter base 24 and packing gland 21. Flange 90 is sealed against leakage by O-ring 92 disposed in annular groove 94 and is attached to primary vessel flange 12 by bolts 96 which utilize the threaded blind bores 98 in flange 12 previously provided for mounting adapter base 24. The remainder of vessel adapter flange 90 is identical with improved vessel flange 52, and no change is required in lower coupling portion 68.

From the foregoing description it will be apparent that there has been provided an improved dynamic and static seal assembly for a mixer shaft in a closable vessel using a quick connect coupling, wherein the mixer shaft is dynamically sealed against leakage from the vessel during mixing use and is both dynamically and statically sealed in satisfaction of Federal regulations for over-the-road transport of hazardous materials. Variations and modifications of the herein described quick connect and seal assembly, in accordance with the invention, will undoubtedly suggest themselves to those skilled in this art. Accordingly, the foregoing description should be taken as illustrative and not in a limiting sense.

What is claimed is:

1. A seal assembly for a closable vessel having a mixer shaft extending through a wall thereof and a mixer drive connectable to the mixer shaft via a quick connect shaft coupling having upper and lower matable and separable portions, the seal assembly comprising:

a) a vessel flange sealingly mounted in a port in said vessel wall and having a central bore therethrough for admission of said mixer shaft to said vessel;

b) a ring seal assembly disposed in said bore and having a circular lip in dynamic sealing contact with a surface portion of said mixer shaft; and c) a lower coupling portion fixedly mounted on the upper end of said mixer shaft and rotatable therewith and having a cylindrical portion slidable into said central bore in said vessel flange to effect a static seal between said cylindrical portion and said bore.

2. A seal assembly in accordance with claim 1 further comprising a shaft bearing disposed in said bore between said shaft and said vessel flange.

3. A seal assembly in accordance with claim 2 wherein said shaft bearing is disposed immediately adjacent to said ring seal assembly.

4. A seal assembly in accordance with claim 3 wherein said shaft bearing is a bushing formed from a fluorocarbon polymer.

5. A seal assembly in accordance with claim 1 further comprising a sealing element disposed between said cylindrical portion and said flange bore to form said static seal in said flange bore.

6. A seal assembly in accordance with claim 5 wherein said sealing element is an elastomeric ring disposed in an annular groove in said cylindrical portion.

7. A seal assembly in accordance with claim 1 further comprising a static seal between said mixer shaft and said lower coupling portion.

8. A seal assembly in accordance with claim 1 further comprising a static seal between said ring seal assembly and said bore.

9. A seal assembly in accordance with claim 1 wherein said ring seal assembly includes a fluorocarbon polymer.

10. A seal assembly in accordance with claim 1 wherein said lower coupling portion is matable with a prior art upper coupling portion.

11. A seal assembly in accordance with claim 1 wherein said vessel flange is a secondary adaptor flange formed to conformably and sealingly mate with a primary vessel flange disposed in said port in said vessel wall to provide said seal assembly as part of a retrofit coupling.

12. A seal assembly in accordance with claim 1 further comprising a pin lock disposed in a transverse bore in said vessel flange and engageable with an annular groove in said cylindrical portion to lock said cylindrical portion in said central bore in said vessel flange.

13. A seal assembly in accordance with claim 1 wherein said secondary vessel flange is disposed outside of the said primary vessel flange and is bolted thereto.

* * * * *